United States Patent
Suzuki

(10) Patent No.: US 7,964,796 B2
(45) Date of Patent: Jun. 21, 2011

(54) PROTECTOR

(75) Inventor: Takashi Suzuki, Yokkaichi (JP)

(73) Assignee: Sumitomo Wiring Systems, Ltd., Mie (JP)

(*) Notice: Subject to any disclaimer, the term of this patent is extended or adjusted under 35 U.S.C. 154(b) by 773 days.

(21) Appl. No.: 12/065,337

(22) PCT Filed: Mar. 7, 2007

(86) PCT No.: PCT/JP2007/054392
§ 371 (c)(1),
(2), (4) Date: Feb. 29, 2008

(87) PCT Pub. No.: WO2008/041379
PCT Pub. Date: Oct. 4, 2008

(65) Prior Publication Data
US 2010/0147584 A1    Jun. 17, 2010

(30) Foreign Application Priority Data

Sep. 29, 2006  (JP) ................. 2006-266946

(51) Int. Cl.
*H02G 3/06*    (2006.01)
(52) U.S. Cl. ....... 174/72 C; 174/72 A; 174/97; 248/68.1
(58) Field of Classification Search ............... 174/68.1, 174/68.3, 72 A, 72 C, 101, 19, 92, 97; 248/68.1, 248/74.1; 29/592.1
See application file for complete search history.

(56) References Cited

U.S. PATENT DOCUMENTS

| 4,864,082 | A  | * | 9/1989  | Ono et al. ................... 174/97 |
| 6,126,123 | A  | * | 10/2000 | Yang ......................... 248/74.1 |
| 6,444,903 | B2 | * | 9/2002  | Saeki et al. ............... 174/72 A |
| 6,878,879 | B2 | * | 4/2005  | Takahashi et al. ....... 174/72 A |
| 7,017,615 | B2 | * | 3/2006  | Suzuki et al. ............ 174/101 |
| 7,825,339 | B2 | * | 11/2010 | Suzuki ..................... 174/101 |

FOREIGN PATENT DOCUMENTS

| JP | 2-26321  | 2/1990 |
| JP | 6-2924   | 1/1994 |
| JP | 9-191527 | 7/1997 |

OTHER PUBLICATIONS

English language Abstract of JP 9-191527.

* cited by examiner

*Primary Examiner* — Angel R Estrada
(74) *Attorney, Agent, or Firm* — Greenblum & Bernstein P.L.C.

(57) ABSTRACT

In a protector, made of resin molding, through which a group of electric wires is penetrated, a branch-wire branching portion is projected slantly from a trough-shaped protector body along a direction in which the branch wires are wired, and the branch-wire branching portion has a bottom wall and one side wall and is sectionally L-shaped, and an auxiliary wall for tape-winding use is projected from an outer surface of the one side wall of the branch-wire branching portion with the auxiliary wall for tape-winding use forming an angle in a range of 90 degrees±20 degrees to the protector body.

In the above-described construction, with branch wires inserted through the branch-wire branching portion, a tape is wound round peripheral surfaces of the branch wires, a peripheral surface of the branch-wire branching portion, and a periphery of the auxiliary wall for tape-winding use to fix the branch wires to the branch-wire branching portion.

15 Claims, 6 Drawing Sheets

PROTECTOR

TECHNICAL FIELD

The present invention relates to a protector which is mounted on a group of electric wires (wire harness) wired on a car. More particularly, in a protector which has a branch-wire branching portion projected from the body thereof, the present invention is intended to improve operability in winding a tape for branch-wire fixing use round branch wires and the branch-wire branching portion to fix the branch wires to the branch-wire branching portion.

BACKGROUND ART

A wire harness is wired on a car with the wire harness inserted into a protector which is a resin molding to protect the wire harness from external interfering members and restrict the wiring line of the wire harness.

There is a case in which the wire harness inserted into the protector is connected to electric apparatuses mounted on a vehicle body by branching branch wires off trunk wires at a necessary position. At the branching position of the branch wires, by winding a tape round the branched branch wires and a branch-wire branching portion, the branch wires are fixed to the branch-wire branching portion projected from the protector body.

As the protector of this kind for use in the wire harness for branching the branch wires from the trunk wires, there is proposed a protector shown in FIG. 6, as disclosed in Japanese Utility Model Application Laid-Open No. 6-2924 (patent document 1).

In the protector, the sectionally concave branch wire receiving portion 1 is projected from the protector body 2, and the placing base 3, for use in the wire harness, which is lower than the side wall 1a is projected from the inner-side bottom surface of the branch wire receiving portion 1. The tape T is wound round the periphery of the branch wire receiving portion 1 and that of the branch wires W1 disposed at the branch wire receiving portion 1 to fix the branch wires W1 to the branch wire receiving portion 1.

When in the protector having the branch wire receiving portion 1, the wiring direction of the branch wires inclines to the protector body 2, as shown in the drawing, the branch wire receiving portion 1 is projected from the protector 2 with the branch wire receiving portion 1 inclining to the protector body 2.

In this case, in the protector disclosed in the patent document 1, as shown in FIG. 7, in winding the tape T round the periphery of the branch wires W1 and that of the branch wire receiving portion 1 by pulling the tape T out of the tape coil with the branch wires W1 disposed at the branch wire receiving portion 1, the direction X in which the tape T is wound inclines to the direction Y in which the protector body 2 extends. Thus the tape coil TC from which the tape T is pulled out contacts the side wall of the protector body 2. Therefore an operator's hand holding the tape coil TC strikes the protector body 2, which makes it difficult to perform a tape-winding operation. Further the tape T wrinkles. Consequently the branch wires W1 is insufficiently fixed to the branch wire receiving portion 1. To perform the tape-winding operation without wrinkling the tape T, the operator is required to pay close attention, which imposes a burden on the operator.

Patent document 1: Japanese Utility Model Application Laid-Open No. 6-2924

DISCLOSURE OF THE INVENTION

Problem to be Solved by the Invention

The present invention has been made in view of the above-described problems. Therefore it is an object of the present invention to prevent a tape wound round branch wires and a branch-wire receiving portion of a protector to fix the branch wires to the branch-wire receiving portion from contacting a side wall of a protector body by adjusting a tape-winding direction when the branch-wire receiving portion has an inclination to the protector body so that a tape-winding operability can be improved.

Means for Solving the Problem

To achieve the object, in a protector, of the present invention made of resin molding, through which a group of electric wires is penetrated, a branch-wire branching portion is projected slantly from a trough-shaped protector body along a direction in which the branch wires are wired; and the branch-wire branching portion has a bottom wall and one side wall and is sectionally L-shaped; and an auxiliary wall for tape-winding use is projected from an outer surface of the one side wall of the branch-wire branching portion with the auxiliary wall for tape-winding use forming an angle in a range of 90 degrees±20 degrees to the one side wall of the protector body.

In the above-described construction, with branch wires inserted through the branch-wire branching portion, a tape is wound round peripheral surfaces of the branch wires, a peripheral surface of the branch-wire branching portion, and a periphery of the auxiliary wall for tape-winding use to fix the branch wires to the branch-wire branching portion.

In winding the tape round the branch-wire branching portion to fix the branch wires to the branch-wire branching portion, the tape is wound round the branch wires and the branch-wire branching portion while the tape coil is being rotated with the branch-wire branching portion projected from the protector body serving as the axis of the rotation thereof.

By projecting the auxiliary wall for tape-winding use from the outer surface of the one side wall of the branch-wire branching portion with the auxiliary wall for tape-winding use forming an angle in the range of 90 degrees±20 degrees to the side wall of the protector body, the tape is wound not round the one side wall of the branch-wire branching portion, but round the auxiliary wall for tape-winding use, the periphery of the branch wires, and the bottom wall of the branch-wire branching portion. Therefore regarding the tape-winding direction with respect to the protector body, the tape-winding direction is approximately orthogonal to the direction in which the auxiliary wall for tape-winding use is extended.

Therefore even though the one side wall of the branch-wire branching portion inclines out of the range of 90 degrees±20 degrees to the side wall of the protector body, the inclination out of the range of 90 degrees±20 degrees thereof is corrected by means of the auxiliary wall for tape-winding use so that the inclination thereof can be approximately orthogonal to the side wall of the protector body. Thereby it is possible to make the tape-winding direction orthogonal to the auxiliary wall for tape-winding use almost parallel with the side wall of the protector body.

Therefore in winding the tape pulled out of the tape coil round the branch-wire branching portion and the branch wires, while the tape coil is being rotated with the branch-wire branching portion serving as the axis of the rotation thereof, the locus of the rotation of the tape does not intersect with the protector body. Therefore it is possible to prevent the tape coil from contacting the protector body, easily perform the tape-winding operation, and decrease a burden to be imposed on an operator.

Further because the tape can be wound round the branch-wire branching portion and the branch wires approximately orthogonally thereto, the tape does not wrinkle and the branch wires can be firmly fixed to the branch-wire branching portion.

The reason the auxiliary wall for tape-winding use is projected in the range of 90 degrees±20 degrees to the protector body is because the protector body is disposed on the locus of the wound tape when the inclination of the auxiliary wall for tape-winding use is projected out of this range, the tape coil interferes with the protector body in the tape-winding operation, and an operator's hand holding the tape coil TC strikes the protector body, which makes it difficult to perform tape-winding and branch wire-fixing operations.

It is especially preferable to project the auxiliary wall for tape-winding use at 90 degrees from the protector body, because at 90 degrees, the tape-winding direction and the protector body are parallel with each other.

The length of the branch-wire branching portion is set to 20 to 40 mm and favorably about 30 mm.

The length of the branch-wire branching portion is so set that the branch wires can be fixed to a branched position. If the length of the branch-wire branching portion is less than 20 mm, there is a fear that the length of the branch-wire branching portion is less than the width of the tape. If the length of the branch-wire branching portion is 40 mm, the branch wires can be sufficiently fixed to the branched position.

More specifically, a bottom wall of the branch-wire branching portion is projected from a bottom wall of the protector body by cutting out one side wall of the protector body; and the one side wall of the branch-wire branching portion and the auxiliary wall thereof for tape-winding use are projected from the side wall of the protector body.

By composing the branch-wire branching portion of the bottom wall and the one side wall in the shape of an approximately L in section, at the open other side of the branch-wire branching portion, the tape can be directly stuck to the outer surfaces of the branch wires. The side wall may be projectingly formed at both sides of the bottom wall of the branch-wire branching portion in the widthwise direction thereof to shape the branch-wire branching portion sectionally concavely to insert the branch wires into a concavity.

A rib for tape-winding use may be formed projectingly from an outer surface of the auxiliary wall for tape-winding use along a tape-winding direction.

As described above, by forming the rib for tape-winding use projectingly from the auxiliary wall for tape-winding use along the tape-winding direction, there is an increase in the area of contact between the tape and the auxiliary wall for tape-winding use. Therefore even though the tape is firmly wound round the branch-wire branching portion, the tape is not broken by the edge of the auxiliary wall for tape-winding use and in addition, the auxiliary wall for tape-winding use can reinforced.

The rib for tape-winding use may be projected from one side or both sides of the auxiliary wall for tape-winding use. Instead of forming the rib for tape-winding use on the auxiliary wall for tape-winding use, the outer surface of the auxiliary wall for tape-winding use may be formed in the shape of a circular arc.

Effect of the Invention

As described above, because in the present invention, the auxiliary wall for tape-winding use is projected from the protector body almost orthogonally thereto, it is possible to make the tape-winding direction approximately orthogonal to the side wall of the protector body. Therefore the tape coil does not contact the protector body at a tape-winding time, and the tape-winding operation can be performed easily. Thus a burden to be imposed on the operator can be reduced.

Further because the tape can be wound round the branch-wire branching portion and the branch wires approximately orthogonally thereto, the tape does not wrinkle and the branch wires can be firmly fixed to the branch-wire branching portion.

Further by forming the rib for tape-winding use projectingly from the auxiliary wall for tape-winding use along the tape-winding direction, there is an increase in the area of contact between the tape and the auxiliary wall for tape-winding use. Therefore even though the tape is firmly wound round the branch-wire branching portion, the tape is not broken by the edge of the auxiliary wall for tape-winding use.

EXPLANATION OF REFERENCE NUMERALS AND SYMBOLS

Figure 1:
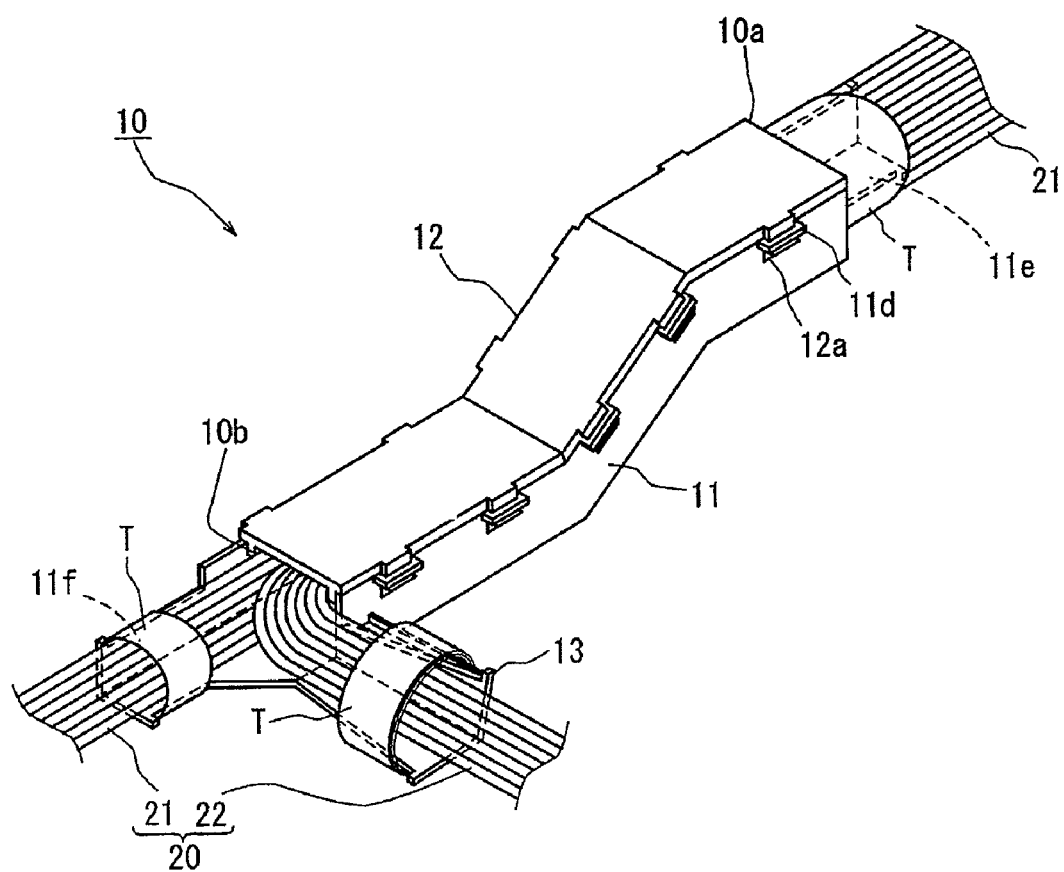
FIG. 1 is a perspective view showing a protector of the present invention.

10: protector
11: protector body
  11$a$: side wall
  11$b$: bottom wall
12: cover
13: branch-wire branching portion
  13$a$: bottom wall
  13$b$: one side wall
14: auxiliary wall for tape-winding use
  14$a$: rib for tape-winding use
20: wire harness
21: trunk wire
22: branch wire
T: tape
TC: tape coil
X: tape-winding direction

BEST MODE FOR CARRYING OUT THE INVENTION

An embodiment of the present invention will be described below with reference to FIGS. 1 through 4.

In a protector 10 of the present invention, a group of electric wires composing trunk wires 21 of a wire harness 20 is penetrated through the protector 10, and branch wires 22 are branched off the trunk wires 21.

The protector 10 has a protector body 11 made of resin molding and a cover 12 to be placed on the protector body 11.

Figure 2:
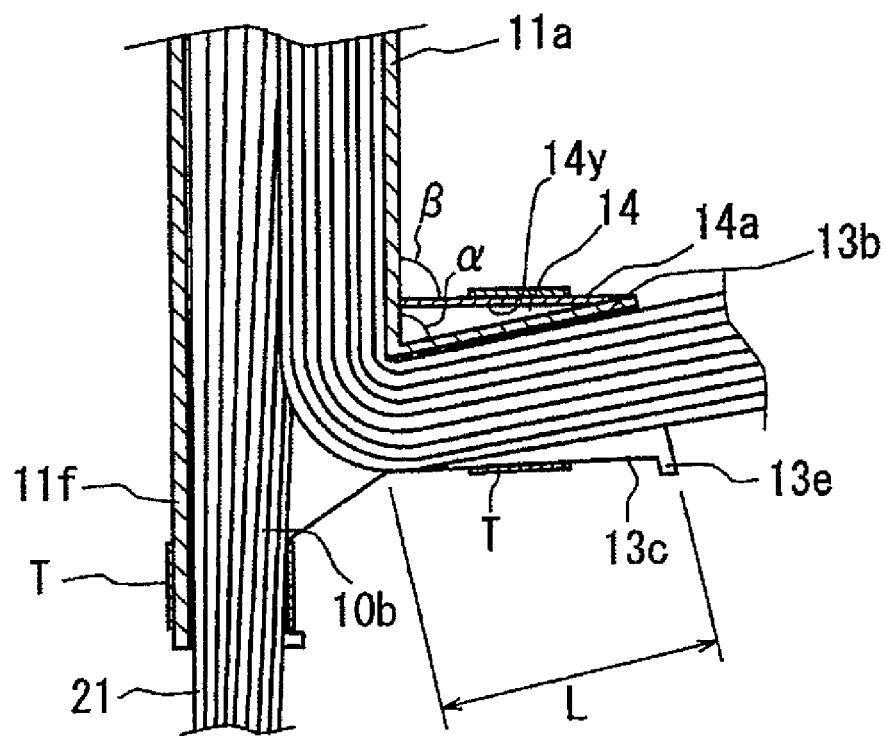
FIG. 2 is a sectional view in which main parts of the protector in FIG. 1 are enlarged.

As shown in FIGS. 1 and 2, the trunk wires 21 are inserted through the protector body 11 from a one-end opening 10a, and the branch wires 22 are branched off the trunk wires 21 at an other-end opening 10b.

The protector body 11 has the shape of a trough open at its upper end and is curved in the shape of approximately a letter S from a trunk-wire insertion side toward a branch-wire branching side. At an edge of the protector body 11 disposed at an upper-end opening thereof, frame portions 11d to which claw portions 12a of the cover 12 which are described later are locked respectively are formed with the frame portions 11d spaced at certain intervals.

A trunk wire-fixing portion 11e is projected at the side of the one-end opening 10a of the protector body 11 so that the trunk wires 21 inserted into the protector body 11 are fixed to the trunk wire-fixing portion 11e with a tape T.

A trunk wire-fixing portion 11f is provided at the other-end opening 10b of the protector body 11 so that the trunk wires 21 are fixed to the trunk wire-fixing portion 11f at the other end of the protector body 11 with the tape T.

A branch-wire branching portion 13 to which the branch wires 22 branched off the trunk wires 21 are fixed by winding a tape round the branch wires 22 and the branch-wire branching portion 13 is projected from one side portion of the trunk wire-fixing portion 11f of the other-end opening 10b.

Figure 3A:
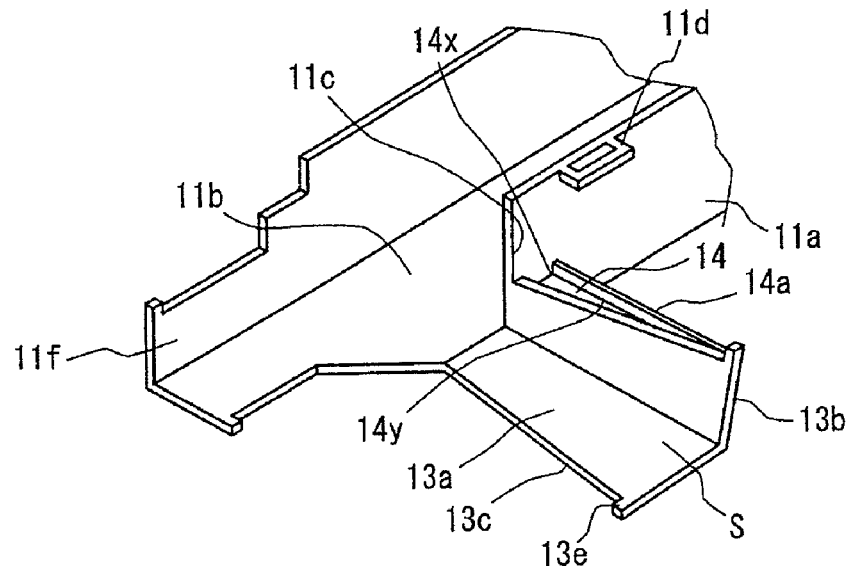
FIG. 3(A) is a perspective view of a branch-wire branching portion; 3(B) is a plan view of 3(A); and 3(C) is a sectional view taken along a line A-A of 3(B).
Figure 3B:
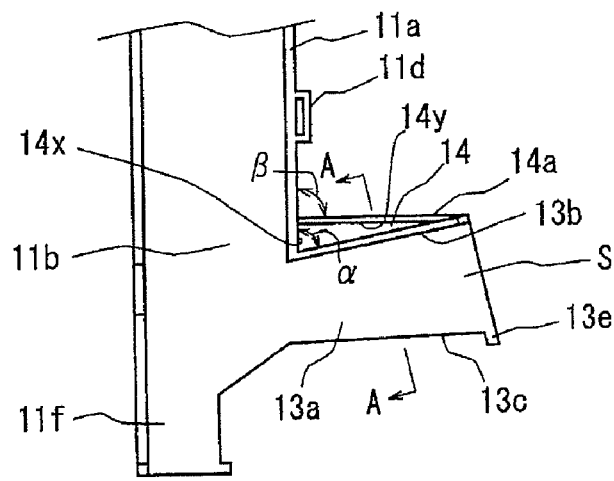
Figure 3C:
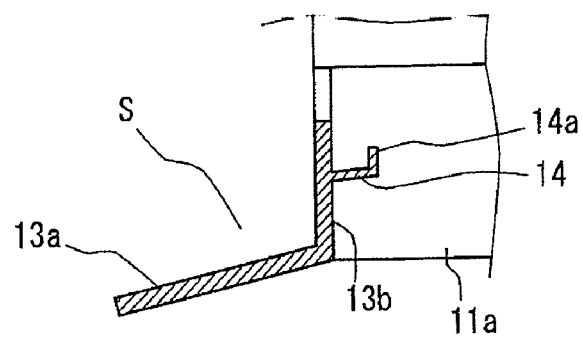

As shown in FIGS. 3(A) and 3(C), the branch-wire branching portion 13 has a bottom wall 13a and a side wall 13b disposed at one side of the bottom wall 13a and is thus sectionally L-shaped. A side wall 11a of the protector body 11 is cut out to project the branch-wire branching portion 13 from a bottom wall 11b of the protector body 11 along a direction in which the branch wires 22 are wired. The direction in which the branch-wire branching portion 13 is projected inclines to the side wall 11a of the protector body 11. In this embodiment, an inclination angle α is set to about 70 degrees. The length L of the branch-wire branching portion 13 is set to 30 mm.

The bottom wall 13a of the branch-wire branching portion 13 is projected from the bottom wall 11b of the protector body 11 with the bottom wall 13a continuous with the bottom wall 11b. The side wall 13b is projected from a lower portion of a cut-out end 11c of the side wall 11a of the protector body 11 with the side wall 13b forming an inclination angle α to the side wall 11a of the protector body 11. A projection 13d for tape-fixing use is projected from a tip of the side wall 13b.

An auxiliary wall 14 for tape-winding use is projected triangularly in a plan view from an outer surface of the side wall 13b of the branch-wire branching portion 13. One side 14x of the auxiliary wall 14 for tape-winding use is continuous with an outer surface of the side wall 11a of the protector body 11. An outer-edge side 14y forms an angle β of 90 degrees to the side wall 11a. A rib 14a for tape-winding use is projected upward along the outer-edge side 14y.

An edge 13c of the bottom wall 13a of the branch-wire branching portion 13 is extended almost parallelly with the rib 14a for tape-winding use. A projection 13e for tape-fixing use is formed at a tip of the edge 13c.

An operation of mounting the protector 10 on the wire harness 20 and winding the tape T on the branch-wire branching portion 13 is described below.

After a group of the electric wires composing the trunk wires 21 and a group of the electric wires composing the branch wires 22 are inserted into the protector body 11 from the upper-end opening thereof, the trunk wires 21 are fixed to the trunk wire-fixing portions 11e, 11f with the tape T.

After the cover 12 is placed on the protector body 11 to close the upper-end opening of the protector body 11 with the cover 12, the claw portions 12a of the cover 12 are inserted into the frame portions 11d of the protector body 11 respectively to lock the cover 12 to the protector body 11. Independence on an assembling process, the cover 12 may be placed on the protector body 11 and thereafter the trunk wires 21 may be fixed to the trunk wire-fixing portions 11e, 11f with the tape T.

Figure 4A:
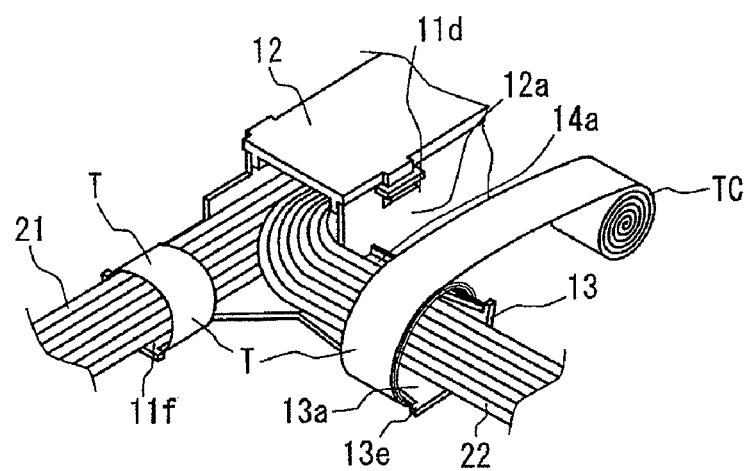
FIG. 4 shows a state in which a tape is wound round the branch-wire branching portion; in which 4(A) is a perspective view, 4(B) is a plan view, and 4(C) is a sectional view taken along a line B-B.
Figure 4B:
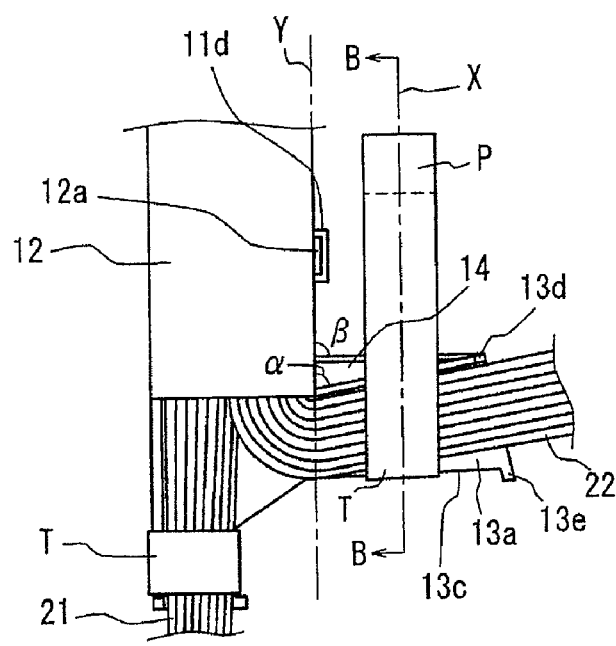
Figure 4C:
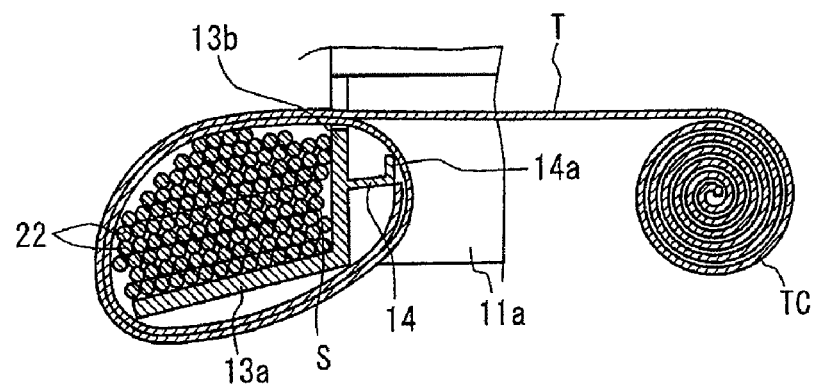

Thereafter as shown in FIGS. 4(A) through 4(C), the branch wires 22 are bent and branched off the trunk wires 21 and inserted into a space S surround with the side wall 13b of the branch-wire branching portion 13 and the bottom wall 13a thereof. With the branch wires 22 disposed along the side wall 13b and the bottom wall 13a, the tape T is wound round a peripheral surface formed of the branch wires 22, the side wall 13b of the branch-wire branching portion 13, the rib 14a for tape-winding use projected from the auxiliary wall 14 for tape-winding use, and the bottom wall 13a to fix the branch wires 22 to the branch-wire branching portion 13.

In a tape-winding operation, the tape pulled out of a tape coil TC is wound round the branch wires 22 and the branch-wire branching portion 13, while the tape coil TC is being rotated with the branch-wire branching portion 13 serving as the axis of the rotation thereof.

As described above, by projecting the auxiliary wall 14 for tape-winding use from the side wall 11a of the protector body 11, even though the side wall 13b of the branch-wire branching portion 13 inclines at the angle α of 70 degrees to the protector body 11, the direction X in which the tape T is wound is orthogonal to the rib 14a for tape-winding use projected at the angle of 13 of 90 degrees from the protector body 11 and to the edge 13c of the bottom wall 13a. Therefore the direction X in which the tape T is wound is parallel with a direction Y in which the side wall 11a of the protector body 11 extends.

Thus in fixing the branch wires 22 to the branch-wire branching portion 13 by winding the tape T round the branch-wire branching portion 13, the locus of the rotation of the tape coil TC does not intersect with the protector body 11. Therefore the tape coil TC does not contact the protector body 11, and it is easy to perform the tape-winding operation for fixing the branch wires 22 to the branch-wire branching portion 13. Thereby it is possible to decrease a burden to be imposed on an operator.

Further because the tape T can be wound round the branch-wire branching portion 13 and the branch wires 22 approximately perpendicularly thereto, the branch wires 22 can be firmly fixed to the branch-wire branching portion 13.

Further by projecting the rib 14a for tape-winding use from the auxiliary wall 14 for tape-winding use along the tape-winding direction, there is an increase in the area of contact between the tape T and the auxiliary wall 14 for tape-winding use. Thus even though the tape T is firmly wound round the branch-wire branching portion 13, the tape T is not broken by the edge of the auxiliary wall 14 for tape-winding use.

Figure 5A:
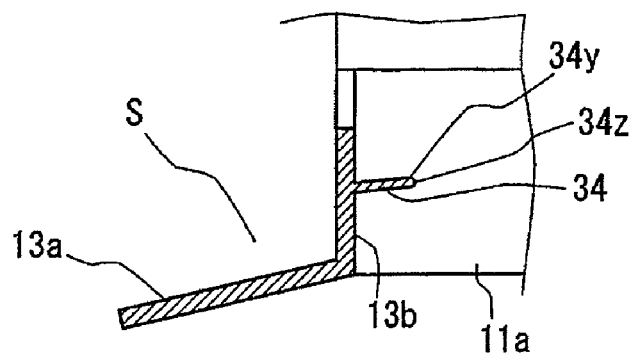
FIG. 5 shows a protector of a second embodiment, in which 5(A) is a sectional view of a branch-wire branching portion and 5(B) is a sectional view of a state in which a tape is wound.
Figure 5B:
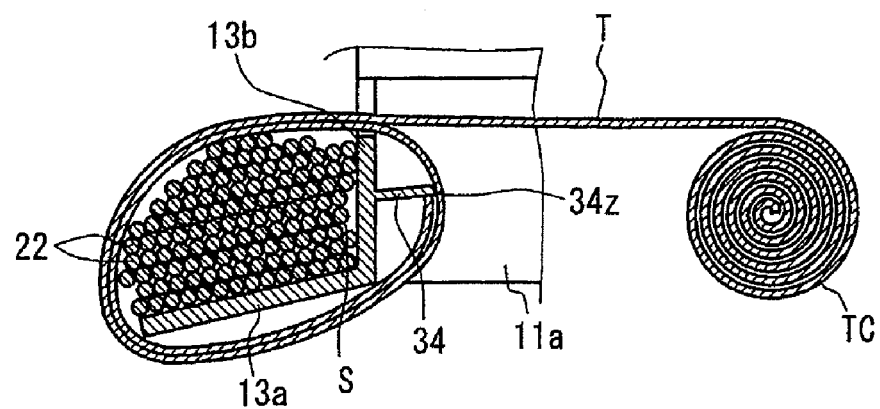
Figure 6:
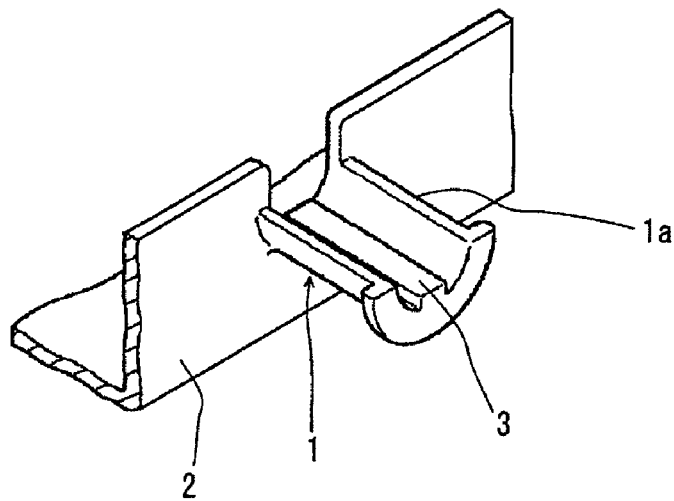
FIG. 6 shows an example of a conventional art.
Figure 7:
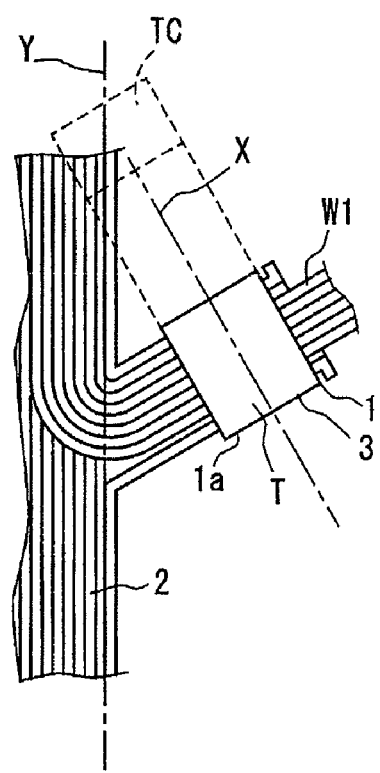
FIG. 7 shows an example of a conventional art.

FIG. 5 shows the second embodiment of the present invention.

The second embodiment is different from the first embodiment in that in the second embodiment, the rib 14a for tape-winding use is not formed on an auxiliary wall 34 for tape-winding use, but a tip of an outer-edge side 34y of the auxiliary wall 34 for tape-winding use is formed as a circular arc portion 34z.

The above-described construction allows the configuration of the auxiliary wall 34 for tape-winding use to be simple. Therefore it is possible to decrease the expense for producing a die.

The other constructions of the second embodiment and the operation and effect thereof are the same as those of the first embodiment. Thus the same parts of the second embodiment as those of the first embodiment are denoted by the same reference numerals as those of the first embodiment, and description thereof is omitted herein.

The invention claimed is:

1. A protector through which a group of electric wires extends, said protector comprising:
   a protector body through which trunk wires extend;
   a branch-wire branching portion through which branch wires extend; said branch-wire branching portion projecting in an inclined direction from said protector body;
   said branch-wire branching portion including a bottom wall, a side wall, and an auxiliary wall projecting from an outer surface of said side wall, said auxiliary wall forming an angle of approximately 90 degrees with a side wall of said protector body; and
   a tape wound around peripheral surfaces of the branch wires, a peripheral surface of said branch-wire branching portion, and a periphery of said auxiliary wall, fixing the branch wires to said branch-wire branching portion.

2. The protector according to claim 1, wherein a length of said branch-wire branching portion is 20 to 40 mm.

3. The protector according to claim 1, wherein said bottom wall of said branch-wire branching portion projects from a bottom wall of said protector body at an aperture in said side wall of said protector body; and said side wall of said branch-wire branching portion and said auxiliary wall project from said side wall of said protector body.

4. The protector according to claim 1, further comprising a rib projecting from an outer surface of said auxiliary wall in a tape-winding direction.

5. The protector according to claim 1, wherein said side wall of said branch-wire branching portion forms an angle of approximately 70 degrees with a side wall of said protector body.

6. A method of manufacturing a protector through which a group of electric wires extends, comprising:
   providing a protector body through which trunk wires extend;
   providing a branch-wire branching portion through which branch wires extend; said branch-wire branching portion projecting in an inclined direction from said protector body;
   providing said branch-wire branching portion with a bottom wall, a side wall, and an auxiliary wall projecting from an outer surface of said side wall, said auxiliary wall forming an angle of approximately 90 degrees with a side wall of said protector body; and
   winding a tape around peripheral surfaces of the branch wires, a peripheral surface of said branch-wire branching portion, and a periphery of said auxiliary wall, thereby fixing the branch wires to said branch-wire branching portion.

7. The method of manufacturing a protector according to claim 6, wherein a length of said branch-wire branching portion is 20 to 40 mm.

8. The method of manufacturing a protector according to claim 6, wherein said bottom wall of said branch-wire branching portion projects from a bottom wall of said protector body at an aperture in said side wall of said protector body; and said side wall of said branch-wire branching portion and said auxiliary wall project from said side wall of said protector body.

9. The method of manufacturing a protector according to claim 6, further comprising providing a rib projecting from an outer surface of said auxiliary wall in a tape-winding direction.

10. The method of manufacturing a protector according to claim 6, wherein said side wall of said branch-wire branching portion forms an angle of approximately 70 degrees with a side wall of said protector body.

11. A protector for receiving a group of electric wires extending therethrough, said protector comprising:
    a protector body configured to receive trunk wires extending therethrough;
    a branch-wire branching portion configured to receive branch wires extending therethrough; said branch-wire branching portion projecting in an inclined direction from said protector body; and
    said branch-wire branching portion including a bottom wall, a side wall, and an auxiliary wall projecting from an outer surface of said side wall, said auxiliary wall forming an angle of approximately 90 degrees with a side wall of said protector body.

12. The protector according to claim 11, wherein a length of said branch-wire branching portion is 20 to 40 mm.

13. The protector according to claim 11, wherein said bottom wall of said branch-wire branching portion projects from a bottom wall of said protector body at an aperture in said side wall of said protector body; and said side wall of said branch-wire branching portion and said auxiliary wall project from said side wall of said protector body.

14. The protector according to claim 11, further comprising a rib projecting from an outer surface of said auxiliary wall in a tape-winding direction.

15. The protector according to claim 11, wherein said side wall of said branch-wire branching portion forms an angle of approximately 70 degrees with a side wall of said protector body.

* * * * *